United States Patent [19]

Delius et al.

[11] Patent Number: 4,690,601

[45] Date of Patent: Sep. 1, 1987

[54] STORAGE ASSEMBLY AND METHOD OF USING SAME

[76] Inventors: Siegried Delius; Doris Delius, both of Rothemsvägen 10, S-595 00 Mjölby, Sweden

[21] Appl. No.: 458,073

[22] Filed: Jan. 14, 1983

Related U.S. Application Data

[63] Continuation of Ser. No. 97,752, Nov. 27, 1979, abandoned.

[30] Foreign Application Priority Data

Dec. 4, 1978 [SE] Sweden ............................ 7812441

[51] Int. Cl.$^4$ ............................................ B65G 57/30
[52] U.S. Cl. ........................ 414/96; 414/37; 414/95; 414/127; 414/786; 211/128
[58] Field of Search ............... 108/51.1, 53.1, 53.3, 108/53.5, 55.3, 91; 211/128, 194; 414/266, 286, 127, 37, 104, 125-126, 95, 96, 786

[56] References Cited

U.S. PATENT DOCUMENTS

| | | | |
|---|---|---|---|
| 1,742,738 | 1/1930 | Turner | 108/53.5 |
| 1,940,242 | 12/1933 | Burgess | 414/608 |
| 2,503,208 | 4/1950 | Nydegger et al. | 108/53.3 |
| 2,779,487 | 1/1957 | Harris | 108/53.3 |
| 2,827,302 | 3/1958 | Skyrud | 108/53.3 |
| 2,940,597 | 6/1960 | Machielse et al. | 108/53.5 |
| 3,294,260 | 12/1966 | Frangos | 414/256 |
| 3,447,697 | 6/1969 | Morey et al. | 414/608 |
| 3,478,897 | 11/1969 | Dykeman | 414/96 |
| 3,537,599 | 11/1970 | Jay | 414/277 |
| 3,557,973 | 1/1971 | Louviers | 414/279 |
| 3,567,300 | 3/1971 | Mari | 211/128 |
| 3,583,580 | 6/1971 | Dean | 414/102 |
| 3,762,343 | 10/1973 | Thacker | 108/53.3 |
| 3,836,026 | 9/1974 | Peterson | 108/53.5 |
| 3,844,423 | 10/1974 | Loomer et al. | 414/96 |
| 3,844,600 | 10/1974 | Jay | 108/53.5 |
| 3,848,747 | 11/1974 | Thompson | 108/53.5 |
| 3,848,755 | 11/1974 | Bussienne et al. | 414/284 |
| 3,918,600 | 11/1975 | Lyon | 414/785 |
| 3,973,685 | 8/1976 | Loomer | 414/284 |
| 4,056,295 | 1/1977 | Downing | 108/91 |
| 4,223,602 | 9/1980 | Mitter | 108/91 |
| 4,273,494 | 6/1981 | Swain et al. | 414/284 |
| 4,395,181 | 7/1983 | Loomer | 414/284 |

FOREIGN PATENT DOCUMENTS

| | | | |
|---|---|---|---|
| 625889 | 1/1963 | Belgium | 108/53 B |
| 535389 | 1/1957 | Canada | 108/53 B |
| 914237 | 7/1949 | Fed. Rep. of Germany | 108/53.5 |
| 2024337 | 11/1971 | Fed. Rep. of Germany | |
| 1221770 | 6/1960 | France | 414/239 |
| 427647 | 6/1967 | Switzerland | 108/53 B |
| 595435 | 12/1947 | United Kingdom | 414/249 |
| 620319 | 3/1949 | United Kingdom | 108/53 B |
| 832434 | 4/1960 | United Kingdom | 108/53.5 |
| 1073711 | 6/1967 | United Kingdom | 108/53 R |

Primary Examiner—Joseph F. Peters, Jr.
Assistant Examiner—Thomas J. Brahan
Attorney, Agent, or Firm—Ladas & Parry

[57] ABSTRACT

A storage assembly comprising load carriers which carry the goods to be stored and are vertically stackable in a plurality of vertical piles closely disposed to each other. The assembly includes pile beds having fixedly disposed support members which support the pile of load carriers at a spaced distance above the floor of the storage plant. At least one carriage is disposed to move below each vertical pile for insertion of the load carriers in the piles and for removal of them therefrom. Each load carrier includes stationary downwardly extending rest members which cooperate with complementary upwardly extending support members secured on each pile bed. The rest members of the lower load carrier of the pile are arranged to be brought out of and into engagement with the support members of the pile bed by vertical movement of the load carriers, which movement is performed by the carriage. When the rest members of the load carrier and the support members of the pile bed are out of engagement, the pile is laterally displaceable in relation to the pile bed by the carriage so that the rest members, the lateral extension of which is limited, can pass the support members vertically after said lateral displacement for insertion or removal of the lower load carrier of each pile. A computer controls the insertion and removal of the load carriers.

8 Claims, 23 Drawing Figures

U.S. Patent  Sep. 1, 1987  Sheet 2 of 4  4,690,601
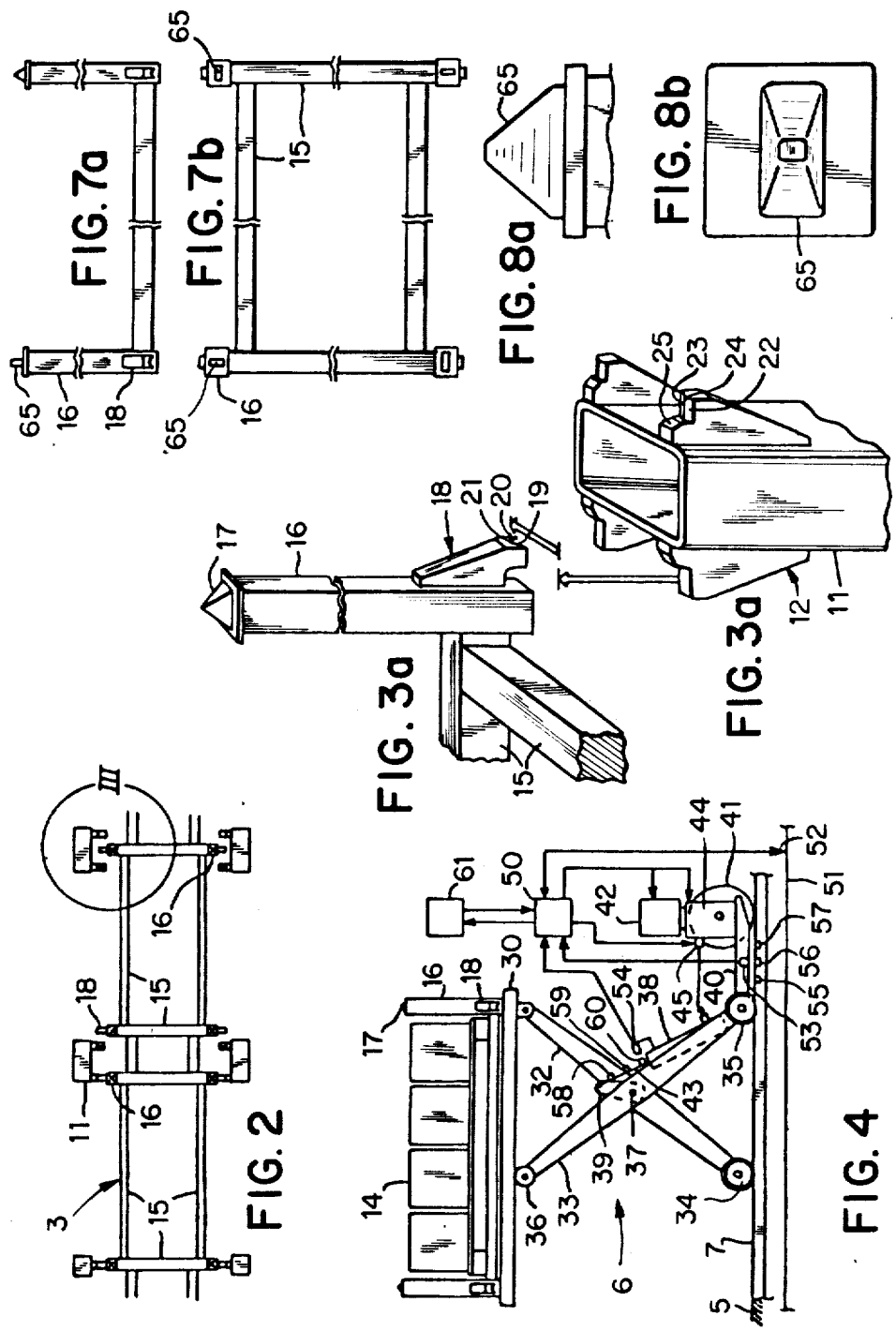

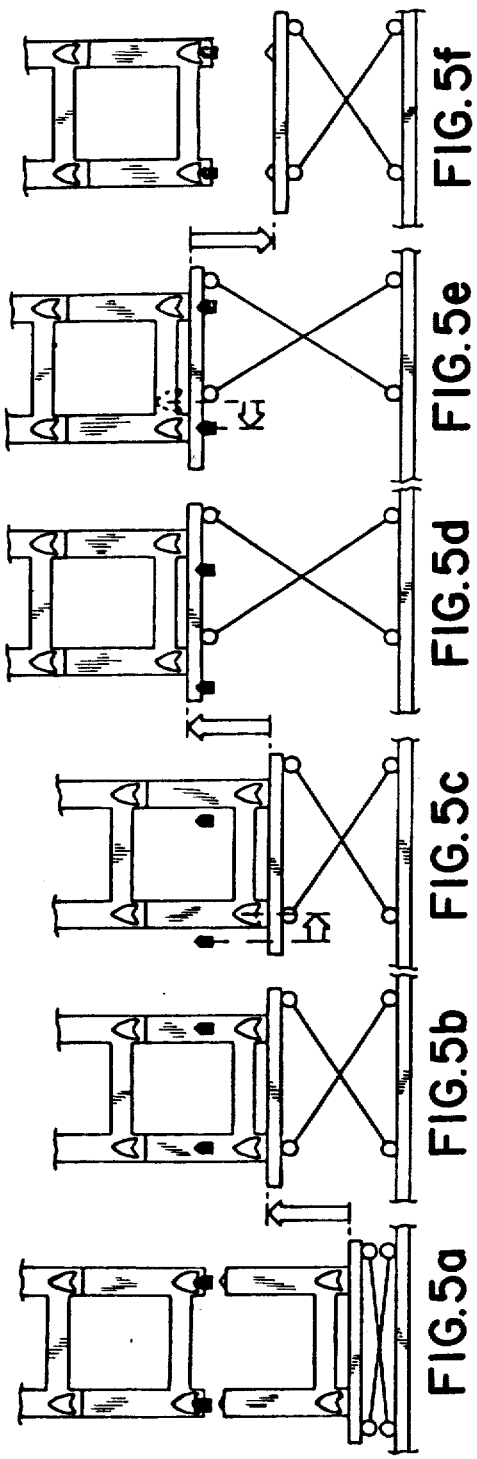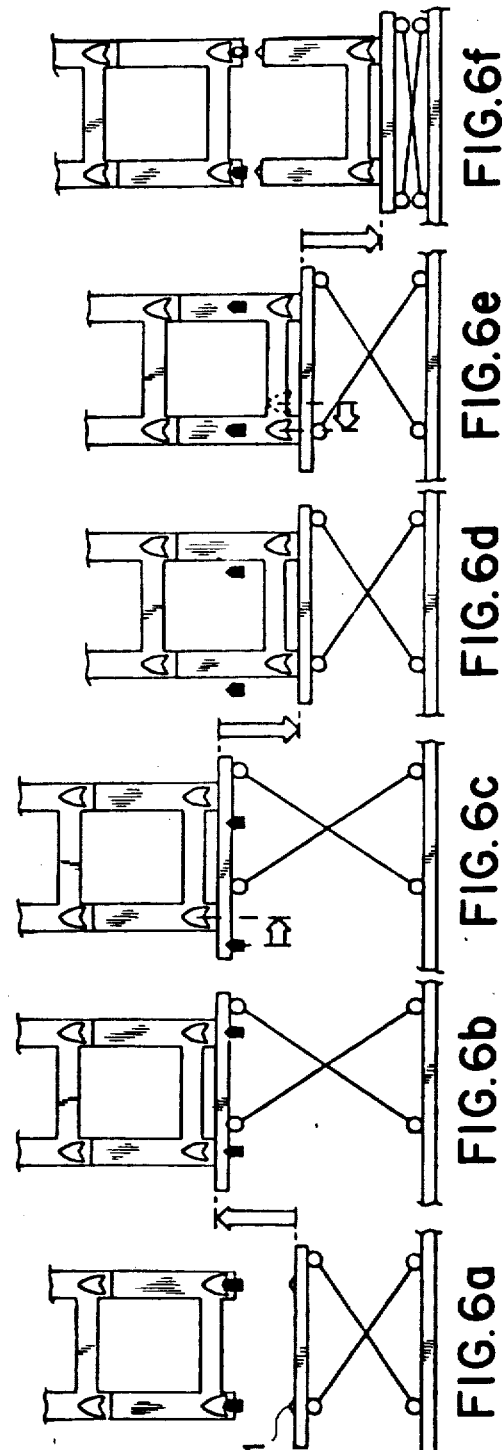

STORAGE ASSEMBLY AND METHOD OF USING SAME

This is a continuation, of application Ser. No. 097,752 filed Nov. 27, 1979 now abandoned.

BACKGROUND OF THE INVENTION

The present invention relates to a storage assembly including load carriers, which carry the goods to be stored and are vertically stackable in a plurality of vertical piles arranged close to each other. Pile beds support each pile of load carriers by support members which are disposed a spaced distance above the floor of the storage plant. At least one carriage is disposed to move directly below each pile for insertion and removal of the load carriers in and from the piles, respectively.

The storage assembly is especially adapted for automatic handling of the load carriers and can be computer controlled.

Such a storage assembly is previously known e.g. German Offenlegungsschrift No. 2 024 337, which discloses a storage assembly where the lower load carrier of a pile of load carriers is supported by a pile bed. The lower load carrier has stationary rest members, cooperating with complementary, pivotal support members on the pile bed. When the pile has been lifted by a carriage, the support members of the pile bed can be pivoted aside and the pile can be lowered so that the rest members of the lower load carrier can pass the support members of the pile bed pivoted aside. The support members of the pile bed are then pivoted back and when the lowering of the pile is continued, these support members cooperate with the rest members of the second lowest load carrier. At continued lowering of the carriage, the lower load carrier is separated while the other part of the pile is being supported by the support members of the pile bed. The separated load carrier can now be carried by the carriage for outfeeding. The load carrier is inserted into the pile in the opposite order.

The drawback of the prior storage plane of this type is that it includes movable support members (in this case pivotal). These support members are adapted to carry the weight of the whole pile and are exposed to heavy stress. Thus, these pivotal support members do no work satisfactorily and can easily be deformed. If automatic storage systems are to work without monitoring, such pivotal details should be avoided. Further, the piles of load carriers should be so stable that automatic transposition can take place without the risk of the piles tipping.

Thus, the object of the present invention is to achieve a storage plant which eliminates the above drawback and which is wellsuited for automatic, computer controlled operation.

SUMMARY OF THE INVENTION

According to the present invention each load carrier includes stationary downwardly extending rest members adapted to cooperate with complementary upwardly extending support members secured on each pile bed. The rest members of the lower load carrier of the pile are arranged to be brought out of and into engagement with the support members of the pile bed by vertical movement of the load carriers, which is performed by the carriage. When the rest members of the load carrier and the support members of the pile bed are out of engagement, the pile is laterally displaceable in relation to the pile bed by the carriage so that the rest members, the lateral extension of which is limited, can pass the support members vertically after said lateral displacement for insertion or removal of the lower load carrier of each pile.

Thus, only the carriage comprises movable parts. These parts are however conventional machine members, which can comparatively easily be made operate satisfactorily.

For safe and stable control of the piles, the support members and/or the rest members of the pile beds have inclined guide surfaces for guiding the rest members into engagement with each other. Preferably, the rest members of the load carrier include two downwardly inclined surfaces, which together form a V, and the support members of the pile bed include two upwardly inclined surfaces, the shape of which is complementary with the surfaces of the rest members. The intersectional line of the inclined surfaces of the rest members of the load carrier is horizontal and perpendicular to the direction of said lateral displacement. For guiding each load carrier in the pile, each load carrier comprises four corner posts, which include at their upper ends pyramid-shaped guidings and at their lower ends recesses fitting thereto for vertical piling of the load carriers on top of each other. Preferably the pyramid-shaped guide members are rectangular in plan view and the guide members of two adjacent corner posts are arranged substantially perpendicular to each other.

The carriage consists of a frame, which is movable on wheels, and is driven by a motor. The frame carries a vertically movable lifting table having engagement members, preferably in the form of pyramid-shaped guidings, for cooperatiion with the lower load carrier of a pile. The lifting table can also comprise a conveying belt, which at the outfeeding position of the carriage, transports the goods from (or to) the load carrier. The conveying belt can be synchronized with another conveying belt arranged in the storage plant for continued transport of the goods.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 2 is a cross-sectional plan view of a portion of the pile bed and the load carriers of the storage assembly of FIG. 1.

FIGS. 3a and 3b are enlarged perspective views of the encircled area III of FIG. 2.

FIG. 4 is a side view of the carriage of the storage assembly of FIG. 1.

FIGS. 5a-f are schematic side views and show the different steps of inserting a load carrier in the assembly.

FIGS. 6a-f are schematic side views and show the different steps of removing a load carrier from the assembly.

FIGS. 7a and 7b are a sectional view and a plan view, respectively, of an alternative embodiment of the load carrier according to the invention.

FIGS. 8a and 8b are a sectional view and a plan view, respectively, of the upper part of the corner posts of the load carrier of FIGS. 7a and 7b.

DETAILED DESCRIPTION

Figure 1:
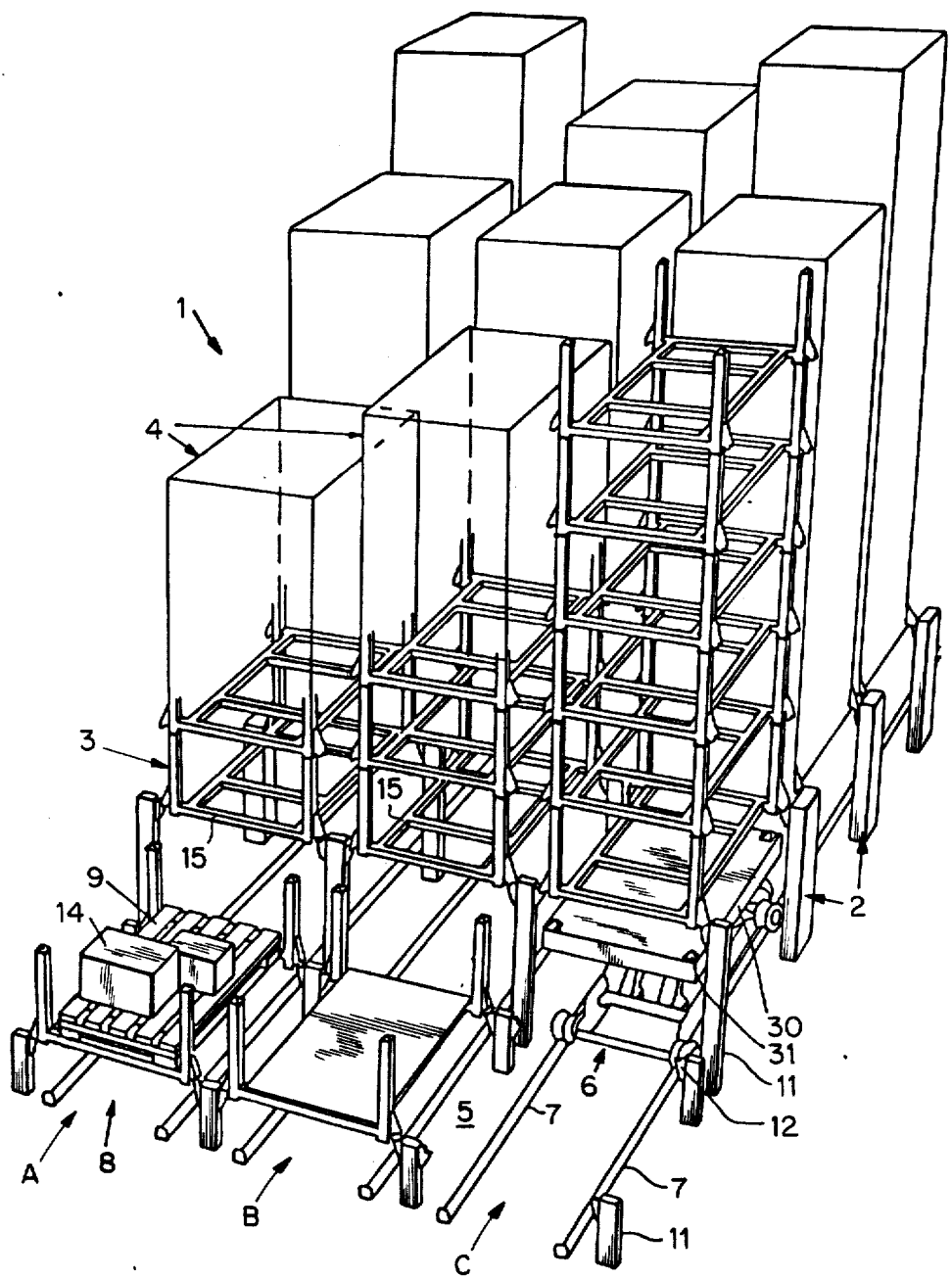
FIG. 1 is a perspective view of a preferred embodiment of the storage assembly made in accordance with the invention.

Referring to FIG. 1, storage assembly 1 includes pile beds 2 arranged close to each other in rows A, B, C. The number of pile beds 2 in each row can be varied according to the demand. Each row is ended by an outfeed station 8 where the goods are loaded and unloaded on each load carrier 3. Further the storage assembly includes a plurality of load carriers 3 piled on top of each other in piles 4 and supported by pile beds 2 at a distance above the floor 5 of the storage plant. Finally the storage assembly 1 includes one or several carriages 6 guided along a path defined by rails 7 for movement under piles 4. The stacks or piles 4 are positioned at a spaced distance above floor 5, so that the carriage 6 carrying a load carrier 3 can freely pass under the piles 4. In other words, the bottommost load carrier of stacks or piles 4 is supported above the path defined by rail 7 on the floor of the storage area to allow the disposition or movement of at least one load carrier conveyed by a carriage 6 beneath the bottommost load carrier of stacks 4 supported above the path.

Each load carrier 3 consists of a rectangular frame 15 and four corner posts 16 projecting from the corners of the frame. The frame 15 carries the goods 14 to be stored. At the upper end of each corner post 16 a guide 17 includes a pyramid-shaped raised member having an essentially square cross-section. The corner post 16 comprises an iron tube having a square cross-section and the pyramid-shaped guide member fits in the lower end of the corner post 16 positioned next above. Thus, the load carriers 3 can be piled on top of each other. The guide means 17 center the corner posts above each other and make each pile 4 of load carriers 3 self-stable.

Thus, as shown in the drawings, pile beds 2 include vertical uprights 11 stationarily arranged on the floor or storage area 5 in a rectangular pattern. Fixedly disposed support members 12 extend outwardly from uprights 11 to engage vertically aligned rest members 18 of load carriers 3. In this embodiment, uprights 11 comprise rectangular iron tubes and each upright 11 can be arranged to support adjacent piles simultaneously. Thus, each upright 11 can include one to four support members 12 projecting outwardly therefrom as shown. As seen in FIG. 4, four adjacent uprights 11 limit an area or a pile surface intended for a pile or stack 4.

Rest members 18 constitute rest means extending outwardly from each load carrier and the fixedly disposed support members 12 engage the rest means when in vertical alignment therewith to maintain a load carrier 3 above the path defined by rails 7. Rest means 18 and the fixedly disposed support members 12 constitute means for supporting a load carrier at a distance above the floor of the storage area to allow the disposition of at least one carrier to be registered underneath the location of a stack disposed in said storage assembly. More specifically, the load carrier may be supported above the path while allowing movement of the carriage 6 with at least one load carrier being conveyed along the path defined by rail 7 beneath the load carrier supported above the path. Stated in another way, the fixedly disposed support members 12 of the stack supporting means engage the rest means 18 when in vertical alignment with each other to maintain the bottommost load carrier above the floor of the storage area. As shown, particularly in FIGS. 5a–5f and FIGS. 6a–6f, fixedly disposed support members 12 are passable vertically by the rest means 18 of a load carrier 3 moving upwardly and downwardly with respect to the floor of the storage area when the rest means 18 and fixedly disposed support members 12 are not in vertical alignment. The load carrier disposed on carriage 6 is moved laterally along the path to move into and out of vertical alignment with the fixedly disposed support members 12 at the stack location in the fashion disclosed in said FIGS. 5 and 6 as noted.

Each corner post 16 includes at its lower portion a protruding rest member 18, which, when in vertical alignment with support members 12 as shown, adapted to cooperate with and rest on the support members 12 of the uprights 11 for supporting the pile 4. Each rest member 18 as shown in FIG. 3a extends laterally outwardly from the load carrier post 16 to which it is attached and includes a protruding console having downwardly facing engagement surfaces 19 and 20, which surfaces form an angle with respect to each other. The intersectional line 21 between the surfaces 19 and 20 is essentially horizontal. Each support member 12 of the upright 11 includes complementary surfaces 22 and 23, the intersectional line 24 of which is also essentially horizontal. Further the support members 12 of the uprights 11 include guiding surfaces 25 for guiding the rest members 18 into engagement with the support members 12.

As is evident in FIGS. 3a and 3b, rest members 18 are shown located vertically upwardly a distance (arrow A) and laterally displaced a distance (arrow B), with respect to the fixedly disposed support members 12. In such a position as shown in the circled portion of FIG. 2, rest members 18 are out of vertical alignment with support members 12. Thus, fixedly disposed support members 12 are passable vertically by rest members 18 when load carrier 3 is moved upwardly and downwardly with respect to the floor of the storage area. When rest members 18 and support members 12 are in vertical alignment as shown with the load carrier on the left-hand side of FIG. 2, rest members 18 may engage the fixedly disposed support members 12 to maintain the bottommost load carrier above the floor of the storage area.

Carriage 6 includes a lifting table 30, having four pyramid-shaped guidings or guide members 31 for cooperating with each end of the four corner posts 16 of the load carrier 3. The lifting table 30 is vertically movable by means of two pairs of scissor legs 32 and 33. The first scissor leg 32 is pivotally connected at its upper end to one edge of the lifting table 30 and carries at its lower end a freely rotatable flanged wheel 34. The second scissor leg 33 is pivotally connected to the first scissor leg 32 at about their respective centers by a shaft 37, and carries at its lower end a freely rotatable flanged wheel 35. The upper end of the second scissor leg 33 carries a wheel 36, which runs against the plane underside of the lifting table 30. The flanged wheels 34 and 35 run on rails 7 arranged on the floor 5 of the storage plant.

A hydraulic piston-cylinder device 38 is attached to the lower portion of the first scissor leg and its movable piston 43 is pivotally connected to a lever 39 which is attached to the second scissor leg 33 adjacent the shaft 37. Thus, when piston 43 is retracted or projected, the lifting table 30 is elevated and lowered, respectively.

A cradle 40 is pivotally mounted at the lower end of the second scissor leg 33 and carries a driving wheel 41 and an electric motor 42 which drives driving wheel 41 via a gear reduction. The motor 42 has two selectable speeds in both directions of rotation. The driving wheel 41 bears against the floor 5 of the storage plant under friction and drives the carriage 6 with high or low speed in both directions.

Cradle 40 also carries an electrically driven hydraulic pump 44 which is connected to the hydraulic cylinder 38 via a hydraulic valve 45 controlled by an electro-magnetic solenoid.

Carriage 6 also includes an electric control unit 50, to which electric power is delivered from a conductor rail 51 via a collecting shoe 52. The electric drive power is delivered by the control unit 50 to the drive motor 42 and the hydraulic pump 44, in dependence of the function to be performed.

Furthermore, two sensors 53 and 54 are connected to the control unit 50. The first sensor 53 is located on the cradle 40 adjacent the rails 5. Three marks 55, 56, 57 are arranged on the rails 5 for each pile. The marks are in front of the sensor 53 when the carriage 6 is under a pile 4. The middle mark 56 is in front of the sensor 53 when carriage 6 is straight under a pile resting on the pile bed. The second sensor 54 is arranged on the hydraulic cylinder 38. The piston 38 projecting from the cylinder carries three marks 58, 59, 60. The first mark 58 is in front of the sensor 54 when the lifting table 30 is in its upper position, the second mark 59 is in front of the sensor 54 when the lifting table 30 is in a middle position, and the third mark 60 is in front of the sensor 54 when the lifting table 30 is in its lower position. The sensors 53 and 54 and the marks 55-60 can be of an electro-magnetic type, an inductive type, an optical type or other types known per se. The sensors 53 and 54 deliver their signals to the control unit 50.

The control unit 50 is connected to a computer 61 which includes a terminal and has a capacity adapted to the size of the storage. The computer 61 keeps track of the goods in the storage and guides the carriages as will be described in greater detail below. For smaller storages it is sufficient if each control unit 50 is a microcomputer which can be programmed to control carriage 6 to perform a predetermined working sequence.

The described electrical control equipment may be altered to a corresponding pneumatic or hydraulic control equipment or combinations thereof.

The operation of the above storage plant is described below, reference being made to FIGS. 5a to f and 6a to f, which show the insertion and removal, respectively, of a load carrier 3 at the lower part of a pile 4.

A load carrier 3 positioned on the carriage 6 with goods, is to be stored in a certain pile or stack, generally designated 4. The carriage 6 can pass in its lowered position under the piles 4 between the uprights 11 of the pile beds 2 on the rails 7. When carriage is approaching the correct pile and the first sensor 53 is in front of the corresponding first mark 55 of the rail, a signal is delivered from the first sensor to the control unit 50 which reduces the speed of the motor 42 to the low speed. When the first sensor 53 is in front of the second, middle mark 56 of the rail, a signal is delivered by the first sensor 53 to control unit 50 which stops motor 42 and thus carriage 6. The carriage 6 is now straight under the pile 4 of load carriers 3 stored on the pile bed 2. This state is shown in FIG. 5a. The lifting table 30 is then raised by means of the hydraulic cylinder 38 until the second sensor 54 is in front of the middle mark 59. The lifting table 30 is now in its middle position as is shown in FIG. 5b. The load carrier 3 is positioned on the lifting table 30 and is to be stored in the pile 4. Its corner posts 16 cooperates with the lowermost load carrier 3 of the pile such that the guide members 17 are fitted in the corresponding lower ends of the corner posts 16 of the load carrier next above. At the continued raising movement of the lifting table 30, the whole pile is elevated as a unit. Thus, the load carrier 3 on the lifting table 30, as shown, constitutes the lowermost load carrier of the pile. The whole pile is now lifted to said middle position. During this lifting movement the rest members 18, which were in engagement with the support members 12 of the uprights 11, have been lifted out of engagement with the support members 12.

The carriage 6 is then moved in the direction of the rails 7 until the first sensor 53 is in front of the third mark 57 on the rail. The rest members 18 of the corner posts 16 of the load carrier 3 have passed beyond the support members 12 of the uprights 11 in the lateral direction. The carriage 6 has now the position shown in FIG. 5c. The lifting table top 30 is then moved upwardly until the second sensor 54 is in front of the third mark 60. Thereat the lifting table 30 assumes the raised position shown in FIG. 5d. Thereat the rest members 18 of the lowermost load carrier 3 on the lifting table 30 has passed beyond the support members 12 and are now above these. The control unit 50 then activates the motor 42 to move carriage 6 with a low speed until the first sensor 53 is opposite the middle, second mark 56 on rail 7. Thereat the rest members 18 of the lower load carrier 3 of the pile are moved so that they will be vertically straight above the support members 12 of uprights 11. This position is shown in FIG. 5e. Finally the lifting table 30 is lowered, whereby the rest members 18 of the lower load carrier 3 are brought into engagement with the support members 12 of uprights 11 as is shown in FIG. 5f. Thus, the pile is supported by the pile bed 2 with the new load carrier 3 stored at the bottom of the pile. The lifting table 30 can remain in its middle position or in its lower position. The first-mentioned end position is shown in FIG. 5f.

The opposite cycle of operation takes place when a load carrier 3, which is at the bottom of the pile, is to be removed. This cycle appears from FIGS. 6a to f and is the reverse of the cycle described for inserting load carrier 3. First, carriage 6 is guided until it is positioned straight under or registered with the bottommost load carrier of the pile 4, i.e. the first sensor 53 is straight in front of the corresponding middle mark 56 (FIG. 6a). The lifting table top 30 is then raised for cooperation with the lower or bottommost load carrier 3 of the pile and for lifting the whole pile so that the rest members 18 of the bottomost load carrier are brought out of engagement with the support members 12 (FIG. 6b). The carriage 6 is then moved laterally until the first sensor 53 is opposite the third mark 57 (FIG. 6c), whereupon carriage 6 is lowered to its middle position where the second sensor 54 is opposite the second mark 59 on the piston rod 43 (FIG. 6d). The carriage 6 is then moved back to the position where the first sensor 53 is straight under the second mark 56 on the rail 7 (FIG. 6e). Finally the lifting table 30 is lowered to its lowermost position where the second mark 54 is opposite the third mark 60 on the piston rod 43 (FIG. 6f). Thereat the lower load carrier 3 is released from the pile positioned above, which is now supported by the support members 12 of the uprights 11. The carriage 6 and the load carrier 3 are then moved to an outfeed station 8.

The control unit 50 receives information on the position of carriage 6 by counting the number of groups of marks 55–57 which carriage 6 passes. Preferably, the speed of carriage 6 is high during the transportation between the various piles when the carriage is empty or carries only one load carrier 3 with goods. During the cycle of insertion or removal which has been described above, when carriage 6 carries the whole pile of load carriers, its speed is low so that there is no risk of the pile tipping.

For reaching a load carrier positioned higher up in a pile, it is realized that several insertion and removal operations are necessary for rearranging the load carriers in a suitable manner. This is preferably controlled by computer 61 so that the least number of transfers will have to be made for the removal and/or the insertion of a given sequence of load carriers. Every moment computer 61 has information on the position of each load carrier. At advanced store handling a storing operation can be associated with a number of logical transfers in several piles in order that the load carrier in question shall reach the correct place in a certain pile. Thus, goods which are frequently demanded can be positioned in the bottom of the pile. During night a rearranging can be made in the piles in order to reset a certain order after the transfers of the day in dependence of the demand frequence. The computer 61 can also be programmed to remember how often a certain type of goods has been demanded and to update itself in dependence of new orders. Computer 61 can also be programmed to take necessary measures during night for fast removals in the morning of a certain specified sequence of load carriers.

At the above-mentioned outfeed station 8 the goods are transloaded on the load carrier. This can mean that a pallet 9 positioned on the load carrier is lifted from the load carrier by a fork truck (not shown). Alternatively, conveying belts can be used as will be described in greater detail below. The outfeed station can include switch points (not shown), which enable each carriage to drive to different rows A, B, C of pile beds.

As will be realized by a person skilled in the art the details of the storage assembly described bove can be varied for adaption to the demand of the single storage. These changes and modifications are included within the scope of the invention.

In the embodiment shown in FIGS. 7a and 7b and in FIGS. 8a and 8b the corner posts 16 of the load carrier include alternative guiding member 65. The guiding member 65, which clearly appears from FIGS. 8a and b, is pyramid-shaped but with a rectangular cross-section or basis. The guiding members 65 of the adjacent corner posts 16 are arranged perpendicular to each other, whereby a more secure guiding of the guiding members 65 into the lower ends of the corner posts of the load carrier lying above is obtained. It is realized that the dimensions of the load carrier are adapted to the goods to be stored so that they are held within the range of the load carrier.

Figure 9:
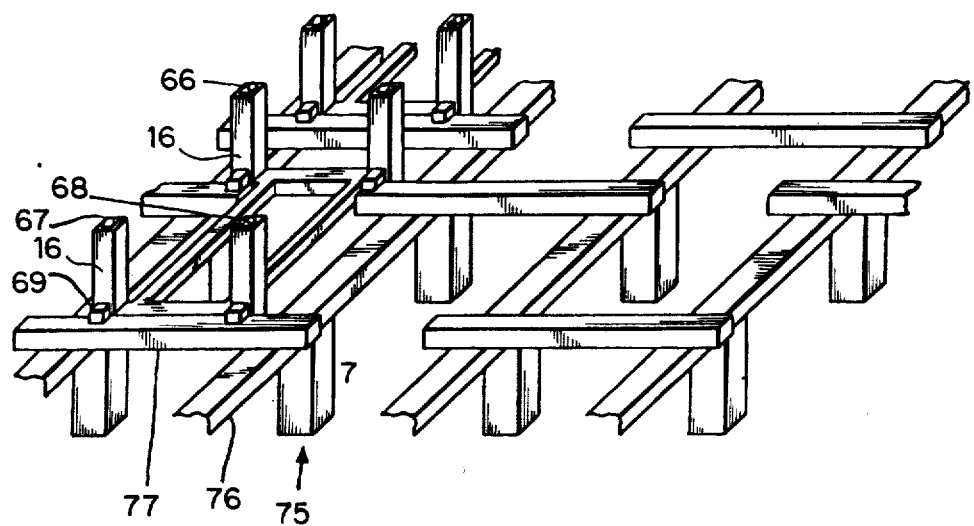
FIG. 9 is a perspective view of another embodiment of the pile bed and the load carrier made in accordance with the invention.

In FIG. 9 a third embodiment of a load carrier according to the invention is shown. In this embodiment, the upper ends of the corner posts 16 are provided with guiding members 66, 67 and 68 having rectangular bases and triangular cross-sections in elevation. Each guiding member 66 has four surfaces, two of which are rectangular and the other two are triangular. The triangular surfaces are essentially vertical, whereas the rectangular surfaces intersect forming an obtuse angle. The guiding members 67 and 68 of two adjacent corner posts are arranged essentially perpendicular to each other.

The load carrier in FIG. 9 includes another embodiment of the rest members 69. Each rest member consists of an essentially parallel-epipedic iron block which is attached to the corner post 16, e.g. by welding. The upper surface of the rest member 69 slopes downwardly from the corner post 16 to constitute a guiding member if the rest members are apt to hit the support members of the uprights at the vertical movement during insertion of the load carrier. Furthermore, the rest member 69 comprises a downwardly facing, support engaging surface, which also slopes downwards from the corner post.

The pile bed 75 shown in FIG. 9 comprises vertical uprights 78 and beams 76 and 77 placed on the uprights. Longitudinal beams 76, are parallel to the rails 7 (shown in FIG. 1) and transverse transversal beams 77 connect two adjacent longitudinal beams 76 and extend somewhat over the longitudinal beams 76. The function of the pile bed 75 appears clearly from FIG. 9. The upper surface of the transverse beams 77 can be somewhat sloping to correspond to the lower surfaces 71 of rest members 69 when rest members 69 and beams 77 are in vertical alignment as shown.

Figure 10:
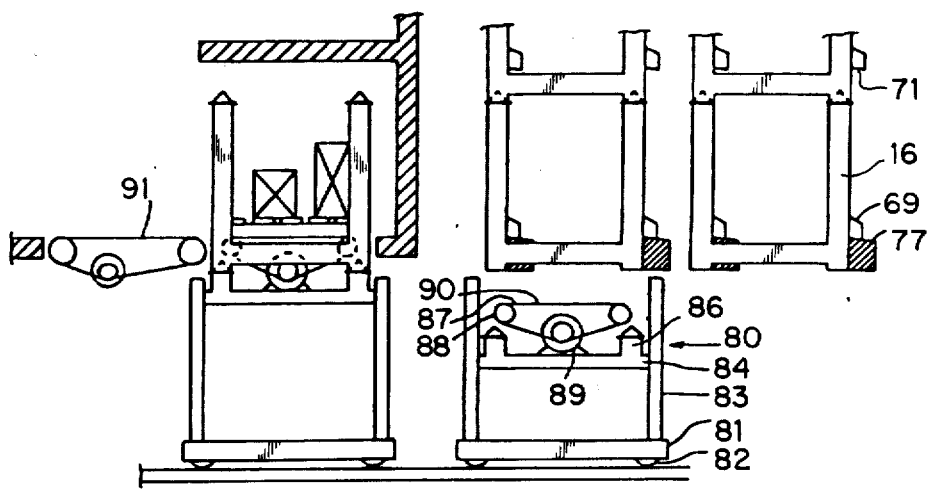
FIG. 10 is a side view of another embodiment of the carriage including a conveying belt.

Finally, another embodiment of the carriage of the invention is shown in FIG. 10. The carriage 80 includes a frame 81 having four flanged wheels 82 running on rails. From the frame four uprights 83 extend in which a lifting table 84 is guided for vertical movement. The lifting table 84 is driven by suitable transmissions in the uprights 83, for instance by four hydraulic cylinders. The lifting table 84 includes guiding members 86 for engagement with a load carrier 3.

Moreover, carriage 80 includes an endless conveying belt 87 which runs over rolls 88 and is driven by a motor 89. The upper surface 90 of conveying belt 87 is positioned on such a height that when the lifting table 84 carries the load carrier, the goods are carried completely by the conveying belt 87. When the carriage is at the outfeed station 8, the driving motor 89 is started, and the goods are delivered to a conveying belt 91 which is positioned in the outfeed station and transports the goods out of the storage. The reverse cycle of operation takes place at infeed of goods to a load carrier. Thereat a sensor can be adapted to sense when the goods are completely on the load carrier. In this way, fully automatic storage handling can be realized. The conveying belt 87 of the carriage 80 can possibly be vertically movable for engagement with the goods only when the carriage is at the outfeed station.

While the storage assembly and method of using same have been shown and described in detail, it is obvious that this invention is not to be considered as being limited to the exact form disclosed, and that changes in detail and construction may be made therein within the scope of the invention, without departing from the spirit thereof.

What is claimed is:

1. A method of stacking load carriers in a storage assembly, said method comprising the steps of:
    (a) providing a plurality of vertically stackable load carriers, pile bed means including vertically disposed uprights having support members fixedly attached to each upright for supporting said load carriers, and at least one carriage operative to move below a load carrier supported by the pile bed means, (b) providing each of the load carriers with a plurality of vertically disposed posts interconnected by frame means which each post including upper guide means at its upper end and lower guide means at its bottom end for cooperative engagement with the upper guide means of another load carrier for vertically stacking the load carriers on top of each other, (c) providing rest means extending outwardly from each load carrier to engage the support members for supporting the bottommost load carrier at an upwardly spaced distance to allow the disposition of the carriage carrying a load carrier underneath the bottommost load carrier supported by the pile bed means, (d) engaging the upwardly directed guide member of the carriage with the lower guide means of a load carrier to be loaded on the bottommost position of a selected pile of load carriers, (e) moving the carriage with the engaged load carrier horizontally to a first position below the selected pile, (f) moving the upwardly directed guide member of the carriage vertically upwardly so that the upper guide means of the load carrier positioned on the carriage cooperatively engage the lower guide means of the bottommost load carrier of the pile in order to raise the whole pile of load carriers thereabove, (g) stopping the vertical movement of the upwardly directed guide member of the carriage at an intermediate position and moving the carriage horizontally a short distance to off-set the rest means of the load carriers from the support members of the pile bed means so that the pile of load carriers is vertically movable without interference of the support members, (h) moving the upwardly directed guide member of the carriage vertically upwardly further until the rest means of the load carrier positioned on the carriage have passed the support members of the pile bed means, (i) moving the carriage horizontally back to a position where the rest means of the load carrier are vertically alligned to rest on the support members of the pile bed means, and (j) moving the upwardly directed guide member of the carriage vertically downwardly until the rest means cooperatively engage the support members of pile bed means for supporting the pile of load carriers.

2. A method of unstacking load carriers in a storage assembly, said method comprising the steps of:

(a) providing a plurality of vertically stackable load carriers, pile bed means including vertically disposed uprights having support members fixedly attached to each upright for supporting said load carriers, and at least one carriage operative to move below a load carrier supported by the pile bed means, (b) providing each of the load carriers with a plurality of vertically disposed posts interconnected by frame means with each post including upper guide means at its upper end and lower guide means at its bottom end for cooperative engagement with the upper guide means of another load carrier for vertically stacking the load carriers on top of each other, (c) providing rest means extending outwardly from each load carrier to engage the support members for supporting the bottommost load carrier at an upwardly spaced distance to allow the disposition of the carriage carrying a load carrier underneath the bottommost load carrier supported by the pile bed means, (d) moving the carriage horizontally to a position below a selected pile of load carriers, (e) moving the upwardly directed guide member of the carriage means vertically upwardly until it cooperatively engages the guide means of the bottommost load carrier of the selected pile to lift the whole pile from the support members of the pile bed means, (f) stopping the upward vertical movement of the upwardly directed guide member and moving the carriage a short distance horizontally to off-set the rest means from the support members of the pile bed means to allow vertical movement of the pile without interference of the support members, (g) moving the upwardly directed guide member of the carriage vertically downwardly to an intermediate vertical position causing the pile to be horizontally movable without interference of the support members, (h) moving the carriage horizontally back to a position where the rest means of the load carrier are vertically aligned to engage with the support members of the pile bed means, and (i) further moving the upwardly directed guide member of the carriage vertically downwardly until the rest means of the second lowermost load carrier of the pile engages the support members of the pile bed means and supports the pile, and the bottommost load carrier is separated from the pile and retained on the carriage.

3. A storage assembly comprising:

(a) a plurality of vertically stackable load carriers, (b) pile bed means including vertically disposed uprights and fixedly disposed support members for supporting said load carriers, (c) each of the load carriers including a plurality of vertically disposed posts interconnected by frame means with each post including upper guide means at its upper end and lower guide means at its bottom end for cooperative engagement with the upper guide means of another load carrier for vertically stacking the load carriers on top of each other, (d) at least one carriage having an upwardly directed carriage guide means and being operative to move below a load carrier supported by the pile bed means, (e) rest means extending outwardly from each carrier to engage the support members for supporting the bottommost load carrier of a stack of load carriers at an upwardly spaced distance to allow the disposition of the carriage carrying a load carrier underneath the bottommost load carrier supported by the pile bed means, and (f) means to horizontally move the carriage below a load carrier supported by the pile bed means to register the upwardly directed carriage guide means of the carriage with the lower guide means of the load carrier posts, (g) said carriage including vertically movable means for having an upwardly directed carriage guide means effective to cooperatively engage the lower guide means of the load carrier posts for vertically moving a load carrier upwardly and downwardly when the upwardly directed carriage guide means of the carriage engages the lower guide means of the load carrier, (h) means for moving the movable means of step g, said assembly being operable for (aa) moving the upwardly directed guide member of the carriage vertically upwardly so that the upper guide means fo the load carrier positioned on the carriage cooperatively engage the lower guide means of the bottmmost load carrier of the pile in order to raise the whole pile of load carriers thereabove, (bb) stopping the vertical movement of the upwardly directed guide member of the carriage at an intermediate position and moving the carriage horizontally a short distance to off-set the rest means of the load carriers from the support members of the pile bed means so that the pile of load carriers is vertically movable without interference of the support members, (cc) moving the upwardly directed guide member of the carriage vertically upwardly further until the rest means of the load carrier positioned on the carriage have passed the support members of the pile bed means, (dd) moving the carriage horizontally back to a position where the rest means of the load carrier are vertically aligned to rest on the support members of the pile bed means, and (ee) moving the upwardly directed guide member of the carriage vertically downwardly until the rest means cooperatively engage the support members of pile bed means for supporting the pile of load carriers.

4. A storage assembly comprising:
(a) a plurality of vertically stackable load carriers,
(b) pile bed means including vertically disposed uprights and fixedly disposed support members for supporting said load carriers,
(c) each of the load carriers including a plurality of vertically disposed posts interconnected by frame means with each post including upper guide means at its upper end and lower guide means at its bottom end for cooperative engagement with the upper guide means of another load carrier for vertically stacking the load carriers on top of each other,
(d) at least one carriage having an upwardly directed carriage guide means and being operative to move below a load carrier supported by the pile bed means,
(e) rest means extending outwardly from each load carrier to engage the support members for positioning the bottommost load carrier of a stack of load carriers at an upwardly spaced distance to allow the disposition of the carriage carrying a load carrier underneath the bottommost load carrier supported by the pile bed means, and
(f) means to horizontally move the carriage below a load carrier supported by the pile bed means to register the upwardly directed carriage guide means of the carriage with the lower guide means of the load carrier posts, (g) said carriage including vertically movable means for having an upwardly directed carriage guide means effective to cooperatively engage the lower guide means of the load carrier posts for vertically moving a load carrier upwardly and downwardly when the upwardly directed carriage guide means of the carriage engages the lower guide means of the load carrier, (h) means for moving the movable means of step g, said assembly being operable for (aa) moving the upwardly directed guide member of the carriage means vertically upwardly until it cooperatively engages the guide means of the bottommost load carrier of the selected pile to lift the whole pile from the support members of the pile bed means, (bb) stopping the upward vertical movement of the upwardly directed guide member and moving the carriage a short distance horizontally to offset the rest means from the support members of the pile bed means to allow vertical movement of the pile without interference of the support members, (cc) moving the upwardly directed guide member of the carriage vertically downwardly to an intermediate vertical position causing the pile to be horizontally movable without interference of the support members, (dd) moving the carriage horizontally back to a position where the rest means of the load carrier are vertically aligned to engage with the support members of the pile bed means, and (ee) further moving the upwardly directed guide member of the carriage vertically downwardly until the rest means of the second lowermost load carrier of the pile engages the support members of the pile bed means and supports the pile, and the bottommost load carrier is separated from the pile and retained on the carriage.

5. A method of stacking load carriers in a storage assembly, said method comprising the steps of:
(a) providing a plurality of vertically stackable load carriers, pile bed means including vertically disposed uprights having support members fixedly attached to each upright for supporting said load carriers, and at least one carriage operative to move below a load carrier supported by the pile bed means,
(b) providing each of the load carriers with a plurality of vertically disposed posts interconnected by frame means with each post including upper guide members at its upper end and lower guide members at its bottom end for cooperative engagement with the upper guide members of another load carrier for vertically stacking the load carriers on top of each other,
(c) providing rest means attached on each load carrier to engage the support members for supporting the bottommost load carrier at an upwardly spaced distance to allow the disposition of the carriage carrying a load carrier underneath the bottommost load carrier support by the pile bed means,
(d) engaging the guide means of the carriage with the lower guide members of a load carrier to be loaded on the bottommost position of a selected pile of load carriers, (e) moving the carriage with the engaged load carrier horizontally to a first position below the selected pile, (f) moving the guide means of the carriage vertically upwardly so that the upper guide members of the load carrier positioned on the carriage cooperatively engage the lower guide members of the bottommost load carrier of the selected pile in order to raise the whole pile of load carriers thereabove, (g) stopping the vertical movement of the guide means of the carriage at an intermediate position and moving the load carriers from the support members of the pile bed means so that the pile of load carriers is vertically movable without interference of the support members, (h) moving the guide means of the carriage vertically upwardly further until the rest means of the load carrier positioned on the carriage have passed the support members of the pile bed means, (i) moving the load carrier back to a position where the rest means of the load carriers are vertically aligned with the support members of the pile bed means, and (j) moving the guide means of the carriage vertically downwardly until the rest means of the bottommost load carrier of the pile cooperatively engage the support members of the pile bed means for supporting the pile of load carriers, and releasing the carriage from the load carrier now loaded.

6. A method of unstacking load carriers in a storage assembly, said method comprising the steps of:

(a) providing a plurality of vertically stackable load carriers, pile bed means including vertically disposed uprights having support members fixedly attached to each upright for supporting said load carriers, and at least one carriage operative to move below a load carrier supported by the pile bed means, (b) providing each of the load carriers with a plurality of vertically disposed posts interconnected by frame means with each post including upper guide members at its upper end and lower guide members at its bottom end for cooperative engagement with the upper guide members of another load carrier for vertically stacking the load carriers on top of each other, (c) providing rest means attached on each load carrier to engage the support members for supporting the bottommost load carrier at an upwardly spaced distance to allow the disposition of the carriage carrying a load carrier underneath the bottommost load carrier supported by the pile bed means, (d) moving the carriage horizontally to a position below a selected pile of load carriers, (e) moving the guide means of the carriage vertically upwardly until it cooperatively engages the guide members of the bottommost load carrier of the selected pile to lift the whole pile from the support members of the pile bed means, (f) stopping the upward vertical movement of the guide means of the carriage at an intermediate position and moving load carriers from the support members of the pile bed means so that the pile of load carriers is vertically movable without interference fo the support members.

(g) moving the guide means of the carriage vertically downwardly until the rest means of the load carrier positioned on the carriage have passed the support members of the pile bed means, (h) moving the load carrier back to a position where the rest means of the load carriers are vertically aligned with the support members of the pile bed means, and (i) further moving the guide means of the carriage vertically downwardly until the rest means of the second lowermost load carrier of the pile engages the support members of the pile bed means and supports the pile, and the bottommost load carrier is separated from the pile and retained on the carriage.

7. A storage assembly comprising:

(a) a plurality of vertically stackable load carriers, (b) pile bed means including vertically disposed uprights and fixedly disposed support members for supporting said load carriers, (c) each of the load carriers including a plurality of vertically disposed posts interconnected by frame means with each post including upper guide members at its upper end and lower guide members at its bottom end for cooperative engagement with the upper guide members of another load carrier for vertically stacking the load carriers on top of each other, (d) at least one carriage having an upwardly directed guide means and being operative to move below a load carrier supported by the pile bed means, (e) rest means attached on each carrier to engage the support members of the pile bed means for supporting the bottommost load carrier of a stack of load carriers to allow the disposition of the carriage carrying a load carrier underneath the bottommost load carrier supported by the pile bed means, and (f) means to horizontally move the carriage below a load carrier supported by the pile bed means to register the guide means of the carriage with the lower guide means of the load carrier posts, (g) said carriage including vertically movable means for having the guide means of the carriage to cooperatively engage the lower guide means of the load carrier posts for vertically moving a load carrier upwardly and downwardly when the guide means of the carriage engages the lower guide means of the load carrier, (h) means for moving said movable means, said assembly being operable for (aa) moving the guide means of the carriage vertically upwardly so that the upper guide members of a load carrier positioned on the carriage cooperatively engage the lower guide member of the bottommost load carrier of the pile in order to raise the whole pile of load carriers thereabove, (bb) stopping the vertical movement of the guide means of the carriage at an intermediate position and moving the load carriers from the support members of the pile bed means so that the pile of load carriers is vertically movable without interference of the support members, (cc) moving the guide means of the carriage vertically upwardly further until the rest means of the load carrier positioned on the carriage have passed the support members of the pile bed means.

(dd) moving the load carriers back to a position where the rest means of the load carriers are vertically aligned with the support members of the pile bed means, and (ee) moving the guide means of the carriage vertically downwardly until the rest means cooperatively engage the support members of pile bed means for supporting the pile of load carriers.

8. A storage assembly comprising:
(a) a plurality of vertically stackable load carriers,
(b) pile bed means including vertically disposed uprights and fixedly disposed support members for supporting said load carriers,
(c) each of the load carriers including a plurality of vertically disposed posts interconnected by frame means with each post including upper guide means at its upper end and lower guide means at its bottom end for cooperative engagement with the upper guide means of another load carrier for vertically stacking the load carriers on top of each other,
(d) at least one carriage having an upwardly directed guide means and being operative to move below a load carrier supported by the pile bed means,
(e) rest means attached on each load carrier to engage the support members of the pile bed means for supporting the bottommost load carrier of a stack of load carriers to allow the disposition of the carriage carrying a load carrier underneath the bottommost load carrier supported by the pile bed means, and
(f) means to horizontally move the carriage below a load carrier supported by the pile bed means to register the guide means of the carriage with the lower guide means of the load carrier posts,
(g) said carriage including vertically movable means for having the guide means of the carriage to cooperatively engage the lower guide means of the load carrier posts for vertically moving a load carrier upwardly and downwardly when the guide means of the carriage engages the lower guide means of the load carrier,
(h) means for moving said movable means,
said assembly being operable for
 (aa) moving the guide means of the carriage vertically upwardly until it cooperatively engages the guide members of the bottommost load carrier of the selected pile to lift the whole pile from the support members of the pile bed means,
 (bb) stopping the vertical movement of the guide means of the carriage and moving the load carriers from the support members of the pile bed means to allow vertical movement of the pile without interference of the support members,
 (cc) moving the guide means of the carriage vertically downwardly to an intermediate vertical position so that the pile of load carriers is vertically movable without interference of the support members,
 (dd) moving the load carriers back to a position where the rest means of the load carrier are vertically aligned with the support members of the pile bed means, and
 (ee) further moving the guide means of the carriage vertically downwardly until the rest means of the second lowermost load carrier of the pile engages the support members of the pile bed means and supports the pile, and the bottommost load carrier is separated from pile and retained on the carriage.

* * * * *

UNITED STATES PATENT AND TRADEMARK OFFICE
CERTIFICATE OF CORRECTION

PATENT NO.  : 4,690,601
DATED       : SEPTEMBER 1, 1987
INVENTOR(S) : SIEGFRIED DELIUS AND DORIS DELIUS

It is certified that error appears in the above-identified patent and that said Letters Patent is hereby corrected as shown below:

Title page, Column 1, Item [76] Inventors:

delete "Siegried" and replace therefor -- Siegfried--.

Signed and Sealed this
Twenty-first Day of June, 1988

*Attest:*

DONALD J. QUIGG

*Attesting Officer*     *Commissioner of Patents and Trademarks*